United States Patent [19]

Wine

[11] 4,363,117

[45] Dec. 7, 1982

[54] VIDEO DISC WITH DYNAMIC STYLUS CLEANING

[75] Inventor: Charles M. Wine, Princeton, N.J.

[73] Assignee: RCA Corporation, New York, N.Y.

[21] Appl. No.: 128,242

[22] Filed: Mar. 7, 1980

[51] Int. Cl.³ .................. G11B 9/06; G11B 17/02; G11B 21/10

[52] U.S. Cl. .................. 369/43; 358/342; 369/32; 369/33; 369/59; 369/126

[58] Field of Search .................. 369/43, 32–33, 369/47–51, 126, 59, 72–74; 360/38; 358/127–132; 346/69

[56] References Cited

U.S. PATENT DOCUMENTS

| 3,525,930 | 8/1970 | Hodge | 360/38 |
|---|---|---|---|
| 3,711,641 | 1/1973 | Palmer . | |
| 3,731,317 | 5/1973 | de Bruyne | 346/69 |
| 3,864,733 | 2/1975 | Boltz . | |
| 4,001,496 | 1/1977 | Clemens . | |
| 4,038,686 | 7/1977 | Baker . | |
| 4,080,625 | 3/1978 | Kawamoto . | |
| 4,119,812 | 10/1978 | Fox . | |
| 4,158,855 | 6/1979 | Thomas et al. | 360/38 |

OTHER PUBLICATIONS

Sono et al., A Consideration of Error Correcting Codes for PCM Recording System, AES preprint No. 1397 (H-4), 11/78.

Ishida et al., A Rotary Head PCM Recorder Employing Error Correction Technique, IEEE Transactions on Consumer Elect., vol. CE-24, No. 4, 11/78, pp. 526–533.

Peterson et al., Error Correcting Codes, 2d Ed., MIT Press, Cambridge, Mass., 1978, pp. 1–17.

Clemens, Capacitive Pickup and the Buried Subcarrier Encoding System for the RCA Video Disc, RCA Review, vol. 39, 3/78, pp. 33–59.

Primary Examiner—Raymond F. Cardillo, Jr.
Attorney, Agent, or Firm—E. M. Whitacre; J. S. Tripoli; E. P. Herrmann

[57] ABSTRACT

A video disc playback system having digital circuitry for detecting degradation in recovered signal. Circuitry is included to determine probable errors in the digital components of signal recovered from the disc record. A digital reference number is generated by storing a valid digital number recovered from the disc and incrementing that number by a constant in accordance with the normal progression of numbers prerecorded on the disc. The recovered numbers are compared with the generated reference numbers to generate an error signal on mismatch. The error signal is used to weight a constant binary number by one or zero, the result being added to an accumulated error function. The sum is weighted, the result becoming the updated accumulated error function for the next iteration on the occurrence of the subsequently recovered digital number. The weighted sum is also compared against a predetermined value and a control signal is generated on the weighted sum exceeding the predetermined value. The control signal is used to attempt to overcome at least one cause of the signal degradation.

5 Claims, 6 Drawing Figures

VIDEO DISC WITH DYNAMIC STYLUS CLEANING

The present invention relates to video disc playback systems and in particular to circuitry for detecting degradation of signal recovered from the disc record.

Certain video disc systems employ disc records on which information is prerecorded in the form of geometric variations along a signal track. The information is recovered from the disc by a signal pickup stylus arranged to engage the disc record. The signal pickup stylus and the geometric variations on the disc record cooperate when relative motion is created therebetween to produce a recovered signal in accordance with the prerecorded information. In the pressure-sensitive signal pickup type systems the stylus tip is constrained to follow the geometric variations per se, the motion induced in the stylus being translated to an electromechanical transducer which produces an electric signal relative to the motion induced in the stylus. In the capacitive type signal pickup systems the geometric variations and the stylus tip form a temporally varying capacitance therebetween, which capacitance variations modulate the resonant frequency of a resonant circuit to modulate the amplitude of a constant frequency signal applied thereto, the amplitude modulation representing the signal recovered from the disc.

The signal pickup stylus of either of these types of systems is subject to picking up or accumulating foreign material as it traverses the signal track on the disc. The foreign material may be dust, moisture, residue from manufacturing the disc or material abraded from the disc by repeated play, etc. The accumulated material has a deleterious effect on stylus performance, i.e., in the pressure-sensitive systems it effectively increases the area of the stylus tip reducing both its frequency and amplitude response to the track geometry while in the capacitive systems it tends to increase the effective stylus-disc separation decreasing the capacitance therebetween and subsequently the amplitude of the recovered signal. It is desirable to remove the accumulated material without significant interruption of play. One means of accomplishing such removal is to cause the stylus to skip several tracks forward and aft of its present play position. The skipping action creates rapid momentum changes in the stylus which tends to jerk or throw the foreign material from the stylus. In addition, the "landing" of the stylus back onto the disc after a flight across several tracks generates an abrading condition between stylus and disc which tends to clear or remove such material.

In many video disc systems it has been found to be advantageous to record digital information along with the recorded video information for the purpose of rapidly locating certain recorded materal on the disc record, or providing special effects such as fast, slow, or stop motion, and search for example. (It should be appreciated that the entire video signal may be arranged in digital format). Typically the digital information is in the form of a numbering sequence with each video field of information being assigned a numerically increasing or decreasing identification number.

In accordance with the present invention, the digital numbers (signal) recovered from the disc are compared against a reference number to determine if an error exists in the recovered number for determining if corrective action is necessary to clear the signal pickup stylus.

In accordance with a further embodiment of the invention, detected errors in the digital signal are weighted and averaged over a running block of possible errors. If an error is present or absent one of two factors "$K_1$", or "$K_0$" are respectively added to a running average error function which is updated once each time digital data is received. The sum of "$K_i$" and the last-most value of the error function is then weighted by a multiplicative factor and compared against a predetermined threshold value. When the error function exceeds the threshold value, a control pulse is generated to initiate corrective action to clear the stylus.

In accordance with a further aspect of the invention, the reference numbers against which the recovered numbers are compared is derived from the first digital number recovered when playback is initiated. This number is stored in temporary memory and incremented or decremented after each digital number is checked for errors. Incrementing (decrementing) the first recovered number provides a sequence of reference numbers which will coincide with the recovered numbers if the stylus is tracking normally, and provides a valid reference regardless of where the pickup stylus initialy engages the disc.

Figure 1:
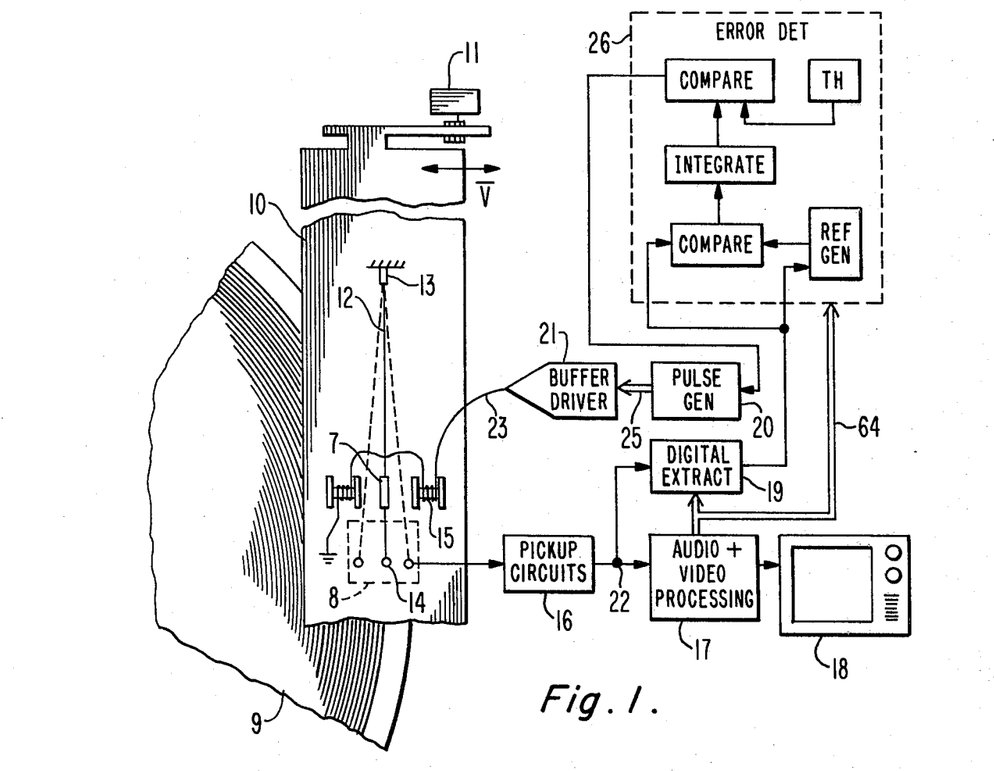
FIG. 1 is a partial schematic, partial block diagram of a video disc playback system including means for detecting a degradation in the recovered signal and means for clearing the pickup stylus of foreign matter.

FIG. 1 shows schematically a portion of a video disc player including the signal recovery apparatus. In the figure a carriage assembly 10 supports and translates a signal pickup stylus 14 across a disc record 9. The pickup stylus 14 engages the disc record through aperture 8 in the carriage, and the carriage is translated by motive means 11. The pickup stylus 14 is mounted to the free end of a rigid stylus arm 12, the second end thereof being secured to the carriage by the compliant coupler 13. The coupler 13 permits relatively free movement of the pickup stylus at least in the direction of carriage movement designated V in the figure.

A transducer for inducing motion to the stylus relative to the carriage and the disc record is included in the carriage assembly. The transducer is exemplified in FIG. 1 by a pair of coils 15 secured to the carriage assembly on either side of the stylus arm. A magnetic element 7 is secured to the stylus arm and disposed between the coils 15. Energization of the coils by a current passed in conductor 23 generates a magnetic flux in the area between the coils sufficient to move the element 7 and thereby deflect the stylus arm 12 and stylus 14 to which it is secured. The direction of the stylus deflection is determined by the polarity of the applied energization current.

The pickup stylus 14 cooperates with the disc record 9 and signal pickup circuitry 16 to recover the prerecorded information on the disc. For an example of the capacitive type video disc systems, see J. K. Clemens', "Capacitive Pickup and the Buried Encoding System for the RCA Video Disc", RCA Review Vol. 39, No. 1, March 1978, pp. 33–59 and U.S. Pat. No. 4,080,625 entitled, "Pickup Circuitry for a Video Disc Player with Printed Circuit Board" issued Mar. 21, 1978 to H. Kawamoto el al. and assigned to RCA Corporation. The recovered signals available from the pickup circuitry 16 at connection 22 are conditioned by the audio and video processing circuitry 17 for application to the antenna input terminals of a typical television receiver 18.

The signal available at connection 22 may be amplitude modulated or phase or frequency modulated etc. depending on the particular system. For descriptive purposes a capacitive disc system will be assumed and the signal at connection 22 will be presumed to be frequency modulated or FM, having a nominal constant amplitude. Buildup of foreign material on the pickup stylus tends to decrease the absolute disc-stylus capacitance reducing temporal disc-stylus capacitance variations representing the recorded information. This reduction in temporal capacitance variations is manifested by a reduction in the amplitude and the quality of the FM signal.

The signal at connection 22 is also applied to circuitry 19 where the digital signal is extracted from the recovered video information and conditioned for use by further digital circuitry. The digital signal is applied to the error detector 26 which checks each digital information number for probable errors due to signal degradation, and on the occurrence of a predetermined number of errors in the last-most "x" digital information numbers recovered where "x" is an arbitrary predetermined number generates a control signal. The error detector 26 includes a reference generator to generate digital reference sequences for comparison with the recovered digital signals from circuit 19. Mismatches in the reference and recovered digital sequences indicate a probable error in the recovered signal. Included in the error detector is circuitry to average the errors detected by performing a discreet integration over a predetermined number of the last-most recovered sequences. The output signal from the integrator is applied to a further comparator which outputs a control signal whenever the average error signal exceeds a preestablished threshold. Both the digital circuit 19 and the error detector 26 may be conditioned to operate synchronously with the recovered signals, e.g., by adapting the horizontal or vertical sync signals from the video processing circuits via connections 64.

The control signal triggers pulse generator 20 to produce a particular sequence of pulses which, when conditioned by buffer 21, energizes the pickup stylus deflection transducer to deflect the stylus fore and aft or vice versa in a direction radially across the disc, a predetermined number of times to attempt removal of foreign matter from the stylus.

It should be noted that for some systems it may be advantageous to extract the digital information from the demodulated video signal from the video processor 17 rather than taking the signal directly from the FM signal at connection 22. In addition, the digital error detector may include a microprocessor, or $\mu$pc, for example, in which case the pulse generating circuitry 20 may be obviated by programming the $\mu$pc to generate the pulse sequence directly.

Figure 2:
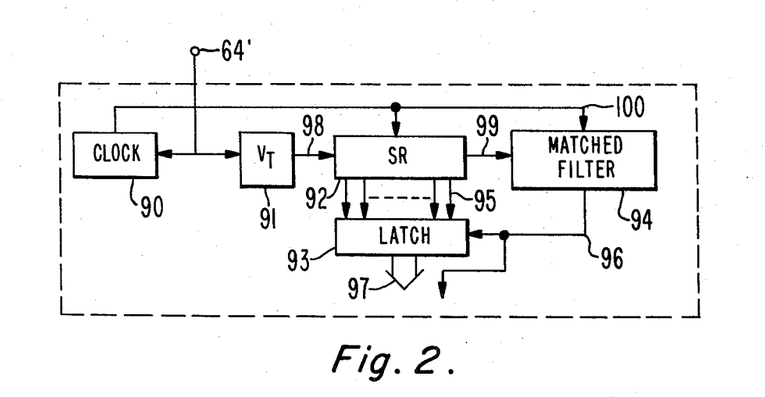
FIG. 2 is a block diagram of circuitry for extracting digitally recorded information from the recovered signal.

The circuitry in FIG. 2 exemplifies a means for extracting the digital information from the recovered signal for digital information arranged in a particular format.

Consider, for example, a video disc in which information is recorded in a generally NTSC format having vertical and horizontal blanking intervals. Normally, the first 21 horizontal lines of each field of display contain no usable video information, thus that portions of a field may be used to contain track identification information. If there exist more than one field per track or convolution, and the fields are radially aligned from track to track so that each field of a track defines an angular sector of the disc, both track and sector information may be included. By way of example consider a record disc having a spiral groove with eight fields per convolution, the fields from convolution to convolution being aligned in eight 45 degree sectors. The fields in a convolution may be sequentially identified by a three bit digital code, and the convolutions may be sequentially numbered by a further digital code. Simply by detecting that a particular identification number, inclusive of convolution number and field or sector number, does not follow a normal progression may be used to detect the occurrence of a probable error. Assume that a digital identification signal, inclusive of an N bit recognition code followed by an M bit field identification number is present on the 17th horizontal line of each field. The M bit field identification number identifies the track convolution and the sector, and the N bit recognition code is used to alert the system that the subsequent M bits comprises useful data, e.g., track numbers. Assume that the maximum bit rate is equal to and synchronized with a fundamental system frequency such as the color burst frequency. Clock 90 oscillates at a substantially constant frequency equal to the requisite fundamental frequency and synchronized therewith and has an output signal suitable for driving logic circuitry. Demodulated video signals from the video processor are aplied via connection 64' to the clock generator 90 for the purpose of synchronizing the clock, and to the threshold detector 91. The threshold circuit conditions the video signal, inclusive of the digital information, to a bilevel signal having logic level amplitudes commensurate for inputting signals to shift register 92. The signal from threshold circuit 91 is sequenced by the clock signal at connection 100, through the M bit serial-parallel shift register 92 and into the N bit matched filter 94. When $\eta$ sequential bits of the signal applied to filter 94 match a recognition signal programmed into the filter, the filter 94 outputs a correlation pulse onto line 96. The following M signal bits concurrently contained in register 92 are the track and sector information bits. M bits of information available from M parallel output lines 95 are latched in element 93 responsive to the correlation pulse occurring on line 96, for use by the error detecting circuit. The correlation pulse also alerts the error detection or calculating means that supposedly valid digital signal is present. Alternatively for error detection circuitry that is arranged to operate on a sequential bit stream, the M signal bits may be accessed in serial format at connection 99. A significant characteristic of matched filters is their ability to recognize a transmitted signal buried in a signal having a very low signal to noise ratio, e.g., less than 1. Therefore, the matched filter may recognize the N bit recognition code even though the signal has degraded below a normally acceptable level.

An alternative to calculating erroneous sequences in the track identification numbers may be had for detecting errors by simply looking for the absence of correlation pulses from the matched filter. Since the digital sequences occur at regularly spaced intervals, the absence of a correlation pulse in one of those intervals indicates an error has occurred in the recognition code. Errors in the recognition code are indicative of signal degradation. The detection of errors in the recognition code may then be used in generating the control signal for deflecting and clearing the pickup stylus.

It is not desirable to trigger a stylus clearing sequence on detection of a single error as the error may be anomalous and not the result of signal degradation. Nor is it desirable to require that a particular number of consecutive errors occur before initiating stylus clearing since the reproduced picture may become unacceptable before this happens. It was found that initiating stylus clearing dependent upon an average number of errors for a given number of possible errors produces more pleasing reproduced video.

Figure 3:
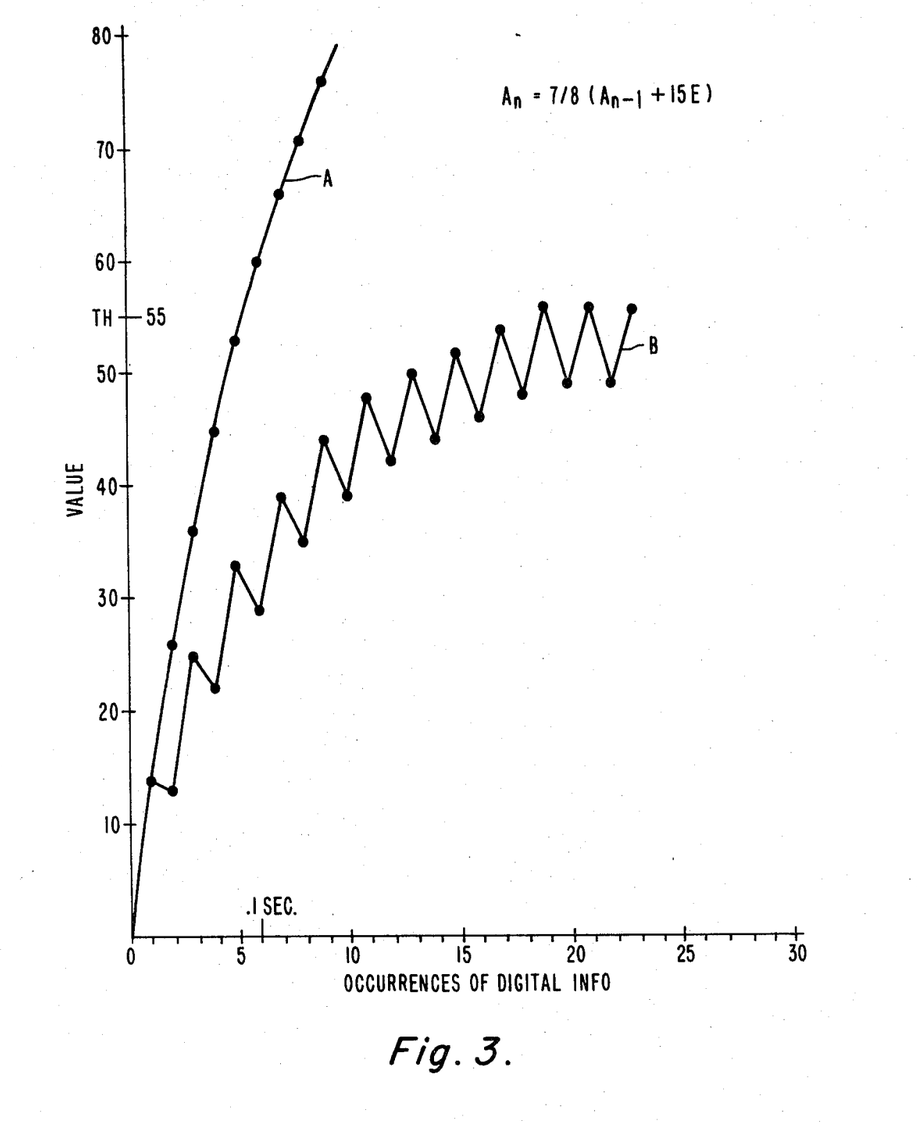
FIG. 3 is a graph of a particular weighted error function.

A particular averaging function which is conveniently implemented in a microprocessor based system is given by the formula $$A_n = K(A_{n-1} + RE) \qquad (1)$$

where $A_n$ is a discreet digital function calculated once for each data read and corresponds to a weighted average error function which is a continuously updated average error for a running set of recovered digital information signals. $A_{n-1}$ is the value of the function $A_n$ calculated for the previously read data, K and R are scaling factors and E is equal to one if the identification number is in error and equal to zero otherwise. FIG. 3 is graph of the function in equation (1) for the case of (A), consecutive erors (ones) and (B) for alternate errors (one-zero-one etc.) with a value of 15 assigned to the scale factor R and a value of $\frac{7}{8}$ assigned to K. Given a system where every video field has an identifying number, and a threshold of 55 is chosen, a control pulse will result in approximately 0.1 sec. for consecutive errors and 0.3 sec. for alternate errors.

Figure 4:
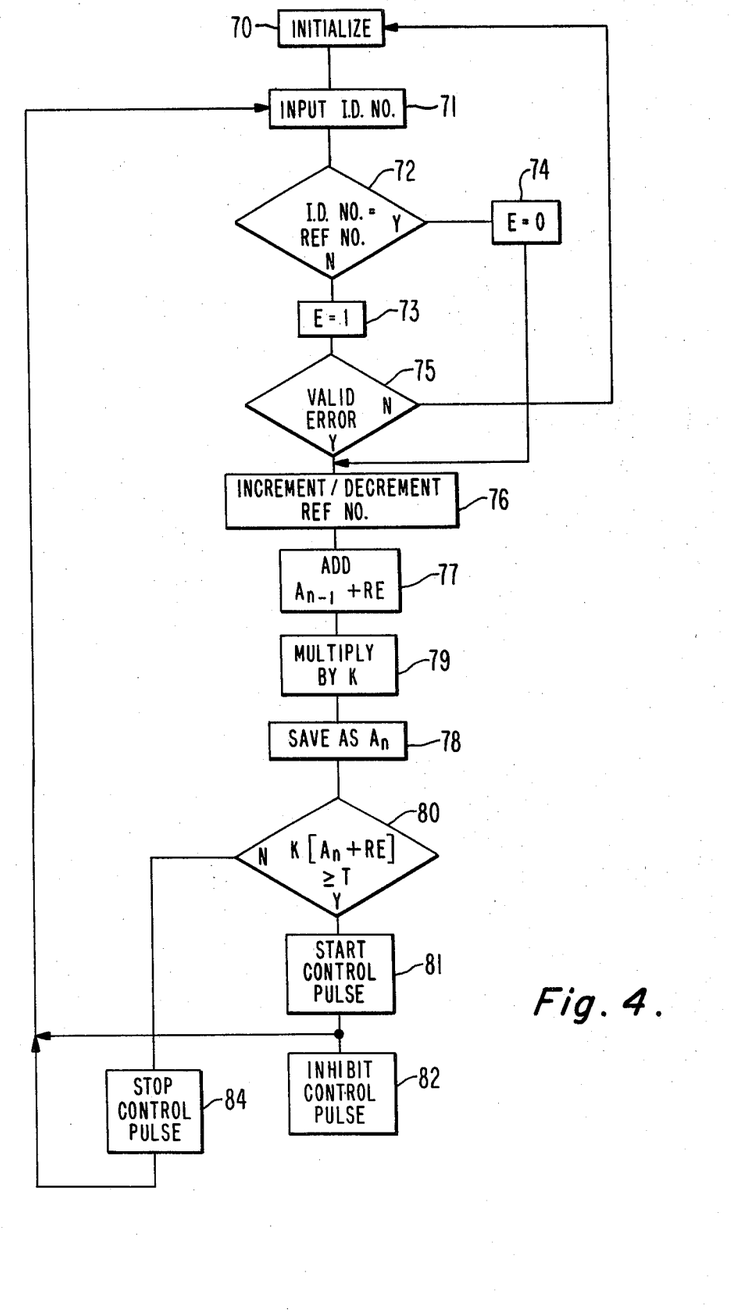
FIG. 4 is a flow chart of the error check-control pulse generating function.

The sequence of events for determining the presence of errors to generate a control pulse to initiate stylus clearing is illustrated in the flow chart of FIG. 4. When the system is put in operation the first step is system initialization, i.e., the first identification number is accepted as a valid reference number (70) and temporarily stored. The identification number is also read into further circuitry (71) and compared against the reference number to ascertain whether they coincide (72). If an error is detected "E" (in equation (1)) is assigned a value of one (73), or, if no error is detected a value of zero is assigned to "E" (74). The system then checks to ascertain if the error detected is a valid error (75); the term "valid error" in the present context is intended to mean an error resulting from signal degradation. Note an invalid error (sequence) will occur if the stylus skipped over a number of groove convolutions and the reference number was not reinitialized to the new number. In this case an error would occur, not as a result of foreign matter accumulating on the stylus, but rather because the current number was compared against an improper reference. Once an identification number has been checked for errors the reference is incremented (or decremented) to coincide with the next succeeding expected identification number (76). The previous error function $A_{n-1}$ is retrieved from storage (78) and added to one of the constants "R" or zero respectively depending on the value of E (77). This sum is multiplied by the scale factor K, typically less than one (79), resulting in the present value of the error function which is stored (78) for the next succeeding calculation and also compared (80) against a predetermined threshold value T. If the error function is less than the threshold value and the system is not presently in a corrective mode, the system returns to wait for the next identification number and reiterates through the sequence upon its arrival. Alternatively, if the error function is equal to or exceeds the threshold value it outputs a control pulse (81) to intitiate corrective action, and the system then waits for the next idnetification number. The control pulse is subject to being inhibited (82) if it is presently undesirable to inititate corrective action.

Once the system has initiated corrective action the information numbers are continually monitored for errors so that the corrective action may be terminated as soon as the stylus is cleared (84). Note, there may be a wide variation in the choice by which the system operates. For example, stylus deflections may occur at a greater or lesser rate than the occurrence of identification numbers. Another consideration is that it may be desirable to inhibit further corrective action after a predetermined maximum number of deflections have been initated as it is more probable that further corrective action will be more detrimental to the overall system than beneficial.

Figures 5, 6:
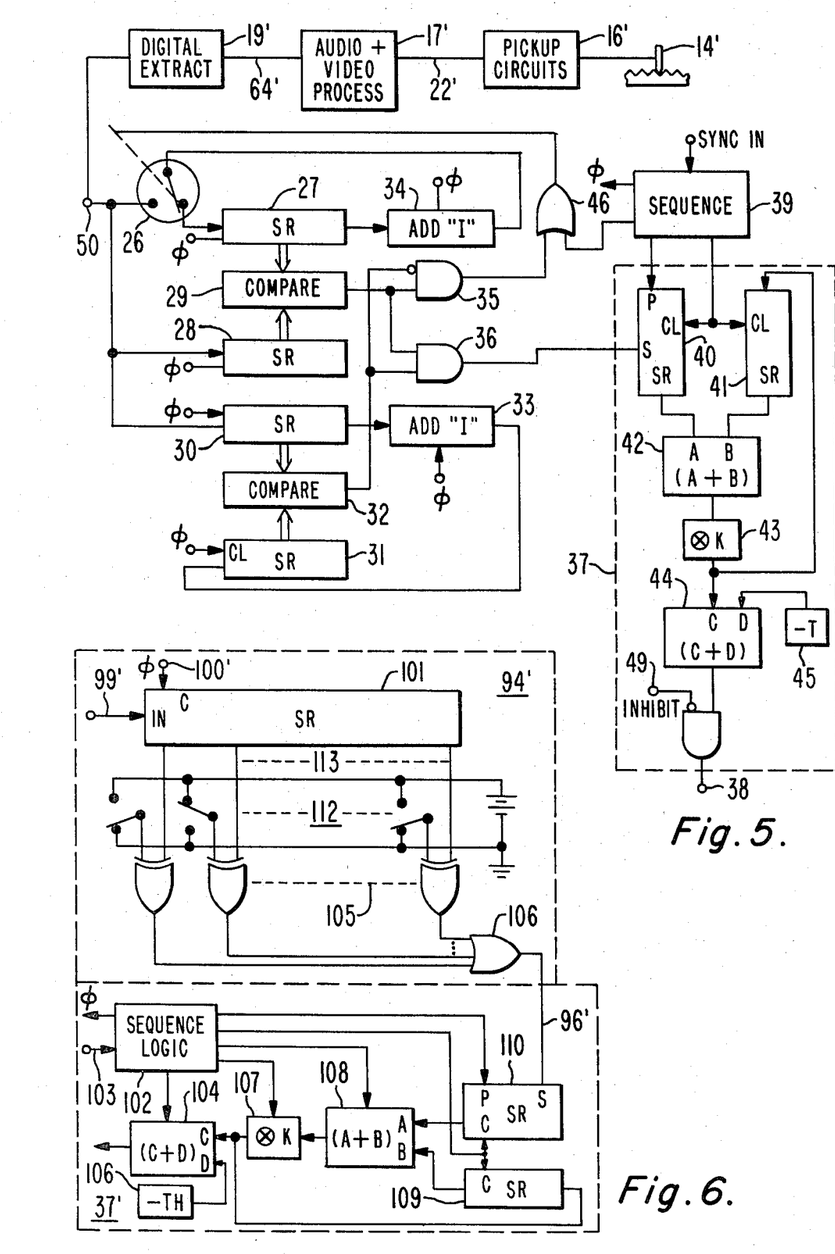
FIGS. 5 and 6 are block diagrams of circuits for detecting errors in the digital information and generating a weighted average error function.

FIG. 5 embodies the present invention and exemplifies circuitry for determining errors in digital sequences that are presumed to be binary coded numbers occurring periodically in generally ascending (descending) order and are not presumed to include parity information. The FIG. 5 circuit is applicable for use with digital sequences occurring in serial format at input terminal 50 but it should be appreciated than an analogous system may be arranged for handling sequences which occur in parallel format.

In the circuit, a sequencer 39 which is synchronized to the recovered signal pattern, generates requisite clock ($\phi$) and other command signals for coordinating the operation of each of the circuit elements.

A reference number is loaded into the serial in-parallel out shift register, SR 27, each time the system is initialized. This reference number is the first digital identification number, IDN, received by the system and is directed by switched 26 from input terminal 50 to the SR 27. Thereafter, switch 26 directs the binary coded output signal from digital ADDER 34 into SR 27 once for each digital number appearing at terminal 50. Considering the occurrence of the IDN's as cyclic, once each cycle the number in SR 27 is clocked by the clock signal $\phi$ into ADDER 34 where it is incremented (decremented) by "I" units and recirculated back into SR 27. The number in SR 27 is continually advanced in accordance with the expected normal progression of IDN's occurring at terminal 50. The IDN's that do occur at terminal 50 are sequenced into SR 28 by the clock $\phi$ synchronously with the recirculation of the reference number in SR 27. Each digital bit in the IDN and the reference number is respectively compared in circuit 29 which outputs a signal responsive to one or more mismatches.

If an error occurs because the stylus translates to a new location, the reference number in SR 27 becomes improper bu this limited system cannot detect such occurrence and would treat succeeding errors as actual errors even though the stylus may be normally tracking the new convolution. To compensate for this type of situation a second similar system comprising SR 30, SR 31, ADDER 33 and circuit 32 is employed which compares each occurring IDN with the previous occurring IDN incremented by "I". The previous IDN present in SR 30 is clocked into ADDER 33 where it is incremented by "I" and then clocked into SR 31 simultaneously with the current IDN being clocked into SR 30. For this latter subsystem, the translation of the pickup stylus to a new convolution followed by subsequent normal stylus tracking of the new convolution and signal recovery, will result in only one detected error. The output signals from circuits 29 and 32 are combined in gate 35 to condition switch 26 to reinitialize SR 27 if circuit 29 registers an error but circuit 32 does not and thereby correct the reference in SR 27 in accordance with stylus translations.

Neither the errors detected in circuit 29 nor 32 are always valid errors. If the stylus skips to a new location circuit 29 registers invalid errors with respect to degradation of recovered signal. Circuit 32 on the other hand will register two errors for the occurrence of one valid error sandwiched between two valid IDN's. This results because the erroneous IDN is first compared with a valid reference in the first cycle and in the next cycle the erroneous IDN is incremented to form an erroneous reference number which compared against the subsequent valid IDN produces the second detected error.

The two signals from circuits 29 and 32 are combined in gate 36 from which error signals are valid with respect to signal degradation except for the possiblity of one invalid error signal attendant each anomolous stylus translation to a new location.

The circuitry circumscribed by the broken line 37 performs the function of averaging the errors as per equation (1). Shift register 41 stores the last-most error function $A_{n-1}$. SR 40 is a presettable register which presets to the digital representaiton of the number R on the occurrence of an error (output from gate 36) and presets to zero otherwise. The numbers $A_{n-1}$ and R are clocked under the control of the sequencing circuit 39 into the digital ADDER 42 to generate the digital representation of the sum $(A_{n-1}+ER)$. This sum is multiplied by the scale factor K programmed into the digital multiplier 43 to produce the product $K(A_{n-1}+ER)$ which represents the current or present value of the error function. This product or value is loaded into SR 41 for availability for the next subsequent calculation; and is also compared against a predetermined threshold T by ADDER 44. ADDER 44 generates an output control signal for $K(A_{n-1}+ER)+(-T)$ being greater than zero which control signal is available at terminal 38 in the absence of inhibit pulses at terminal 49.

The circuit of FIG. 6 illustrates a second type of error detecting for a portion of the digital signal being a constant sequence. This digital sequence is similar to the N bit recognition code described in the foregoing. In the circuit 94', the recovered digital information is applied to terminal 99' and clocked into SR 101. The digital bits in the SR 101 are available at parallel register output terminals 113 to exclusive OR gates 105, each having a second signal input programmed high or low by switches 112. The programming is arranged so that the EXCLUSIVE OR gates output a logic "high" signal for the programmed switch input and the register output being mismatched. The output signal from all of the EXCLUSIVE OR circuits are combined in OR gate 106, which signals preset the presettable SR 110 under the control of sequencer 102. In this arrangement the sequencer is synchronized to effect preset of SR 110 at precisely the time the recognition code should be present in the SR 101. The error averaging circuitry 37' inclusive of SR 110 is essentially the same as the averaging or error function circuitry 37 illustrated in FIG. 5 and operates in a similar manner. The error function is then calculated as in the foregoing.

The circuits illustrated in FIGS. 5 and 6 are included for demonstrative purposes. One skilled in the art of digital systems armed with the foregoing could readily conceive of variations on the system. Variations in the format of coded information numbers with or without parity checks would impose restraints on the method chosen for error detection which in fact may be only a simple parity check. Nor is the invention to be limited to the particular error averaging system shown. The error function described is exemplary and lent itself to implementation by the apparatus shown. It should in fact be readily apparent that the error detection and error averaging may be performed in a digital processor such as a computer or microprocessor (e.g., a Fairchild Semiconductor Corp. F8).

What is claimed is:

1. In a video disc player of the type wherein signal is recovered from a disc record by a disc engaging stylus, said stylus being susceptible to accumulating foreign matter thereon and thereby tending to degrade signal recovery, and wherein the recorded video signal includes sequential digital track identification signals regularly interspersed therein, said player having circuitry for detecting said digital signals, said player further including means responsive to a control signal for translating the stylus in a direction radially across the record in an oscillatory fashion to dislodge said foreign matter, an improved means responsive to said detected digital track identification signals for generating said control signal comprising:
   first means for determining errors in the detected digital information signals; and
   second means for producing said control signal when the number of errors in a predetermined number of lastmost recovered identification signals exceeds a predetermined value.

2. The video disc player set forth in claim 1 wherein the first means includes:
   third means for generating sequential digital reference numbers corresponding to the recorded digital track identification signals; and
   fourth means for comparing said sequential digital reference numbers to the corresponding recovered and detected digital track identification signal.

3. The video disc player set forth in claim 1 or 2 wherein said second means comprises:
   means for generating a weighted average, $A_n$, of the occurrences and non-occurrences of detected track identification signal errors;
   means for comparing each averaged value $A_n$ with a predetermined constant, $T_H$, and generating said control signal when the value of $A_n$ exceeds said predetermined constant $T_H$.

4. The video disc player set forth in claim 3 wherein the weighted average $A_n$ is defined, $$A_n = K(A_{n-1} + RE)$$

where $A_n$ is the present result, K is a constant less than one, $A_{n-1}$ is the result for the lastmost previous occurrence of detected track identification signal, R is a constant greater than one and E is equal to one for a detected track identification signal being in error, and zero for a detected track identification signal not being in error.

5. The video disc player set forth in claim 1, wherein the first and second means are included in a microprocessor.

* * * * *

UNITED STATES PATENT AND TRADEMARK OFFICE
CERTIFICATE OF CORRECTION

PATENT NO. : 4,363,117
DATED : December 7, 1982
INVENTOR(S) : Charles Martin Wine It is certified that error appears in the above-identified patent and that said Letters Patent is hereby corrected as shown below:

| | |
|---|---|
| Column 2, line 7 | "$K_1 38$" should be --$K_1$--. |
| Column 3, line 10 | "el al" should be --et al--. |
| Column 4, line 11 | "portions" should be --portion--. |
| Column 5, line 37 | "is graph" should be --is a graph--. |
| Column 6, line 16 | "idnetification" should be --identification--. |
| Column 6, line 51 | "switched" should be --switch--. |
| Column 7, line 3 | "bu" should be --but--. |
| Column 7, line 43 | "representaiton" should be --representation--. |

Signed and Sealed this

Twenty-second Day of February 1983

[SEAL]

Attest:

GERALD J. MOSSINGHOFF

Attesting Officer   Commissioner of Patents and Trademarks